United States Patent
Yonezawa

(10) Patent No.: US 9,638,837 B2
(45) Date of Patent: May 2, 2017

(54) IMAGING LENS INCLUDING A LENS WITH CONVEX SURFACES FACING EACH OF AN OBJECT AND AN IMAGE SIDE

(71) Applicant: KANTATSU CO., LTD., Yaita-shi, Tochigi (JP)

(72) Inventor: Tomohiro Yonezawa, Sukagawa (JP)

(73) Assignee: KANTATSU CO., LTD., Yaita (JP)

( * ) Notice: Subject to any disclaimer, the term of this patent is extended or adjusted under 35 U.S.C. 154(b) by 223 days.

(21) Appl. No.: 14/454,947

(22) Filed: Aug. 8, 2014

(65) Prior Publication Data

US 2015/0138651 A1 May 21, 2015

(30) Foreign Application Priority Data

Nov. 21, 2013 (JP) .................................. 2013-240693

(51) Int. Cl.
| | |
|---|---|
| *G02B 3/02* | (2006.01) |
| *G02B 13/18* | (2006.01) |
| *G02B 3/04* | (2006.01) |
| *G02B 13/00* | (2006.01) |
| *G02B 9/60* | (2006.01) |

(52) U.S. Cl.
CPC ........... *G02B 3/04* (2013.01); *G02B 13/0015* (2013.01); *G02B 13/0045* (2013.01); *G02B 9/60* (2013.01); *G02B 13/18* (2013.01)

(58) Field of Classification Search
CPC ........ G02B 3/04; G02B 13/0015; G02B 3/02; G02B 13/18
See application file for complete search history.

(56) References Cited

U.S. PATENT DOCUMENTS

| | | |
|---|---|---|
| 8,179,615 B1 | 5/2012 | Tang et al. |
| 8,953,257 B1 | 2/2015 | Chen |
| 2011/0164327 A1* | 7/2011 | Sato ..................... G02B 13/004 359/714 |
| 2013/0003195 A1 | 1/2013 | Kubota et al. |
| 2013/0114151 A1 | 5/2013 | Chen et al. |
| 2013/0201568 A1 | 8/2013 | Tsai et al. |
| 2013/0235474 A1 | 9/2013 | Tsai et al. |
| 2014/0055872 A1 | 2/2014 | Kondo et al. |
| 2015/0124334 A1 | 5/2015 | Jo |

FOREIGN PATENT DOCUMENTS

| | | |
|---|---|---|
| JP | 2010-26434 A | 2/2010 |
| JP | 2011-85733 A | 4/2011 |

* cited by examiner

*Primary Examiner* — Bumsuk Won
*Assistant Examiner* — Tamara Y Washington
(74) *Attorney, Agent, or Firm* — Oliff PLC

(57) ABSTRACT

A compact low-cost imaging lens which provides high brightness with an F-value of 2.5 or less and a wide field of view and corrects aberrations properly, meeting the demand for low-profile design. The imaging lens elements are arranged in the following order from an object side to an image side: an aperture stop; a first lens with positive refractive power having a convex surface on each of the object and image sides; a second lens with negative refractive power; a third lens with positive refractive power having a convex surface on each of the object and image sides; a fourth lens with negative refractive power; and a fifth lens with negative refractive power as a double-sided aspheric lens. The imaging lens satisfies a conditional expression (1) below:

$$1.5 < f3/f < 5.0 \qquad (1)$$

where
f: focal length of the overall optical system of the imaging lens
f3: focal length of the third lens.

9 Claims, 14 Drawing Sheets

IMAGING LENS INCLUDING A LENS WITH CONVEX SURFACES FACING EACH OF AN OBJECT AND AN IMAGE SIDE

The present application is based on and claims priority of Japanese patent application No. 2013-240693 filed on Nov. 21, 2013, the entire contents of which are hereby incorporated by reference.

BACKGROUND OF THE INVENTION

Field of the Invention

The present invention relates to imaging lenses which form an image of an object on a solid-state image sensor such as a CCD sensor or a C-MOS sensor used in a compact image pickup device, and more particularly to imaging lenses which are built in image pickup devices mounted in increasingly compact and low-profile smart phones and mobile phones, PDAs (Personal Digital Assistants), game consoles, information terminals such as PCs, and home appliances with a camera function.

Description of the Related Art

In recent years, there has been a general tendency that most information terminals have a camera function. Also, home appliances with a camera function have been introduced into the market; for example, a user who is away from home can see in real time what is going on at home, through the camera mounted in a home appliance by telecommunication between the home appliance and his/her smart phone. It is thought that products which enhance consumer convenience by adding a camera function to an information terminal or home appliance will be increasingly developed in the future. In addition, the camera mounted in such a product is expected to not only provide high resolution to cope with an increase in the number of pixels but also be compact and low-profile and provide high brightness and a wide field of view. In particular, the imaging lens to be built in a mobile terminal is strongly expected to be low-profile enough to be applicable to a low-profile product.

However, in order to provide a low-profile imaging lens with a wide field of view and high brightness as described above, the following problem has to be addressed: it is difficult to correct aberrations in the peripheral area of the image and ensure high imaging performance throughout the image.

Conventionally, for example, the imaging lenses described in JP-A-2010-026434 (Patent Document 1) and JP-A-2011-085733 (Patent Document 2) are known as compact high-resolution imaging lenses.

Patent Document 1 discloses an imaging lens composed of five constituent lenses, which includes, in order from an object side, a positive first lens, a positive second lens, a negative third lens, a positive fourth lens, and a negative fifth lens, features compactness and high brightness with an F-value of about 2, and corrects various aberrations properly.

Patent Document 2 discloses an imaging lens which includes a first lens group including a first lens having a convex surface on an object side, a second lens group including a second lens having a concave surface on an image side, a third lens group including a meniscus third lens having a concave surface on the object side, a fourth lens group including a meniscus fourth lens having a concave surface on the object side, and a fifth lens group including a meniscus fifth lens having an aspheric surface with an inflection point on the object side. This imaging lens is intended to realize a compact lens system with high resolution.

The imaging lens described in Patent Document 1, composed of five constituent lenses, corrects various aberrations properly and provides high brightness with an F-value of about 2.0 to about 2.5; however, its total track length is longer than the diagonal length of the effective imaging plane of the image sensor, bringing about a disadvantage in making the imaging lens low-profile. Furthermore, if this lens configuration is designed to provide a wide field of view, it will be difficult to correct aberrations in the peripheral area of the image properly.

The imaging lens described in Patent Document 2 has a lens system which is relatively low-profile and able to correct aberrations properly. However, in order to ensure brightness with an F-value of 2.8 or less and a field of view of 65 degrees or more, it has to address the problem of difficulty in correcting aberrations in the peripheral area of the image.

As stated above, in the conventional technology, it is difficult to provide a low-profile imaging lens with a wide field of view which provides high brightness and high resolution.

SUMMARY OF THE INVENTION

The present invention has been made in view of the above problem, and an object thereof is to provide a compact low-cost imaging lens which meets the demand for low-profile design, offers high brightness with an F-value of 2.5 or less and a wide field of view, and corrects various aberrations properly.

Here, the term "low-profile" implies that the total track length is shorter than the diagonal length of the effective imaging plane of the image sensor, and the term "wide field of view" implies that the field of view is 70 degrees or more.

According to one aspect of the present invention, there is provided an imaging lens in which elements are arranged in the following order from an object side to an image side: an aperture stop; a first lens with positive refractive power having a convex surface on each of the object side and the image side; a second lens with negative refractive power; a third lens with positive refractive power having a convex surface on each of the object side and the image side; a fourth lens with negative refractive power; and a fifth lens with negative refractive power as a double-sided aspheric lens. The imaging lens satisfies a conditional expression (1) below:

$$1.5 < f3/f < 5.0 \qquad (1)$$

where f: focal length of the overall optical system of the imaging lens f3: focal length of the third lens.

In the above imaging lens, in order to provide so-called telephoto capability, two lenses located near the image plane, namely the fourth lens and the fifth lens have negative refractive power. When the imaging lens is to be low-profile and provide a wide field of view, the first lens, located nearest to the object, is usually designed to have strong positive refractive power in order to shorten the focal length of the overall optical system. However, if only the first lens has strong positive refractive power, high-order spherical aberrations or astigmatism which occur on the first lens are likely to increase, making it difficult to correct such aberrations. In the present invention, this problem is addressed by using the third lens with positive refractive power so that the required positive refractive power for the overall optical system of the imaging lens is distributed to the first lens and the third lens. In addition, the first lens and the third lens are biconvex lenses in which the object-side and image-side surfaces are both convex, so the positive refractive power of each of these lenses is distributed to the two surfaces, thus making it easy to suppress aberrations. Also, chromatic aberrations are corrected properly by the second lens with negative refractive power.

The conditional expression (1) defines an appropriate range for the ratio of the focal length of the third lens to the focal length of the overall optical system, and indicates a condition to make the imaging lens low-profile and correct spherical aberrations and astigmatism properly. If the value is above the upper limit of the conditional expression (1), the positive refractive power of the third lens would be too weak to ensure a short total track length, necessitating an increase in the positive refractive power of the first lens and thus making it difficult to correct aberrations. On the other hand, if the value is below the lower limit of the conditional expression (1), the refractive power of the third lens would be too strong, unfavorably causing a tendency toward increased spherical aberrations and astigmatism which occurred on the third lens, though it would be effective in shortening the total track length and suppressing aberrations which occurred on the first lens.

More preferably, the imaging lens satisfies a conditional expression (1a) below:

$$1.8 < f3/f < 4.2. \quad (1a)$$

Preferably, the imaging lens according to the present invention satisfies a conditional expression (2) below:

$$-42.0 < f4/f < -8.0 \quad (2)$$

where
f: focal length of the overall optical system of the imaging lens
f4: focal length of the fourth lens.

The conditional expression (2) defines an appropriate range for the ratio of the focal length of the fourth lens to the focal length of the overall optical system, and indicates a condition to adjust the ratio between total track length and back focus to an appropriate range. If the value is above the upper limit of the conditional expression (2), the negative refractive power of the fourth lens would be too strong to shorten the total track length though it would be advantageous in ensuring an appropriate back focus. On the other hand, if the value is below the lower limit of the conditional expression (2), the negative refractive power of the fourth lens would be too weak to ensure an appropriate back focus though it would be advantageous in shortening the total track length. As the conditional expression (2) suggests, the refractive power of the fourth lens is designed to be weak as compared to the refractive power of the overall optical system of the imaging lens, thereby making it easy to optimize the relation between total track length and back focus. Furthermore, when the fourth lens is a double-sided aspheric lens, it can correct off-axial aberrations effectively.

More preferably, the imaging lens satisfies a conditional expression (2a) below:

$$-38.0 < f4/f < -10.0. \quad (2a)$$

Preferably, the imaging lens according to the present invention satisfies a conditional expression (3) below:

$$-8.5 < f5/f < -2.0 \quad (3)$$

where
f: focal length of the overall optical system of the imaging lens
f5: focal length of the fifth lens.

The conditional expression (3) defines an appropriate range for the ratio of the focal length of the fifth lens to the focal length of the overall optical system, and indicates a condition to adjust the ratio between total track length and back focus appropriately along with the fourth lens and adjust the telephoto ratio appropriately. If the value is above the upper limit of the conditional expression (3), the negative refractive power of the fifth lens would be too strong to shorten the total track length, though it would be advantageous in ensuring an appropriate back focus and keeping the telephoto ratio small. On the other hand, if the value is below the lower limit of the conditional expression (3), the negative refractive power of the fifth lens would be too weak to ensure an appropriate back focus and keep the telephoto ratio small, though it would be advantageous in shortening the total track length.

Preferably, the imaging lens according to the present invention satisfies a conditional expression (4) below:

$$0.8 < TLA/f < 1.2 \quad (4)$$

where
TLA: distance on the optical axis from the objet-side surface of the first lens to the image plane without a filter or the like (total track length)
f: focal length of the overall optical system of the imaging lens.

The conditional expression (4) defines an appropriate range for the ratio of total track length to the focal length of the overall optical system, namely the telephoto ratio. When the telephoto ratio of the imaging lens is within the range defined by the conditional expression (4), the imaging lens can correct aberrations easily and also be low-profile.

Preferably, the imaging lens according to the present invention satisfies conditional expressions (5) and (6) below:

$$0 < r4/r5 < 0.3 \quad (5)$$

$$0 < r7/r6 < 0.5 \quad (6)$$

where
r4: curvature radius of the image-side surface of the second lens
r5: curvature radius of the object-side surface of the third lens
r6: curvature radius of the image-side surface of the third lens
r7: curvature radius of the object-side surface of the fourth lens.

The conditional expression (5) defines an appropriate curvature ratio range for the shape of the so-called air lens between the image-side surface of the second lens and the object-side surface of the third lens, and the conditional expression (6) defines an appropriate curvature ratio range for the shape of the air lens between the image-side surface of the third lens and the object-side surface of the fourth lens. When the imaging lens satisfies the conditional expressions (5) and (6), an image is easily transmitted to the image-side lens surface while high-order aberrations which occurred on the third lens and the fourth lens are suppressed.

In the imaging lens according to the present invention, preferably, the fifth lens is a meniscus lens having a concave surface on the image side near the optical axis and both its aspheric surfaces each have a pole-change point. Due to the existence of the pole-change points, as the distance from the optical axis increases, the negative refractive power of the fifth lens decreases gradually and finally changes to positive refractive power in the peripheral portion. This allows correction of field curvature and makes it easy to control the angle of light rays incident on the image sensor. Here, the term "pole-change point" means a point on an aspheric surface at which a tangential plane intersects the optical axis perpendicularly.

If a lens other than the fifth lens also has an appropriate aspheric shape on an appropriate surface as necessary, aberrations can be corrected properly and imaging performance can be improved.

When all the constituent lenses are made of plastic material, the imaging lens according to the present invention can be mass-produced and supplied at low cost.

DETAILED DESCRIPTION OF THE PREFERRED EMBODIMENTS

Hereinafter, the preferred embodiment of the present invention will be described in detail referring to the accompanying drawings. FIGS. 1, 3, 5, 7, 9, 11, and 13 are schematic views showing the general configurations of the imaging lenses in Examples 1 to 7 according to this embodiment, respectively. Since all these examples have the same basic lens configuration, the general configuration of an imaging lens according to this embodiment is explained below referring to the schematic view of Example 1.

Figure 1:
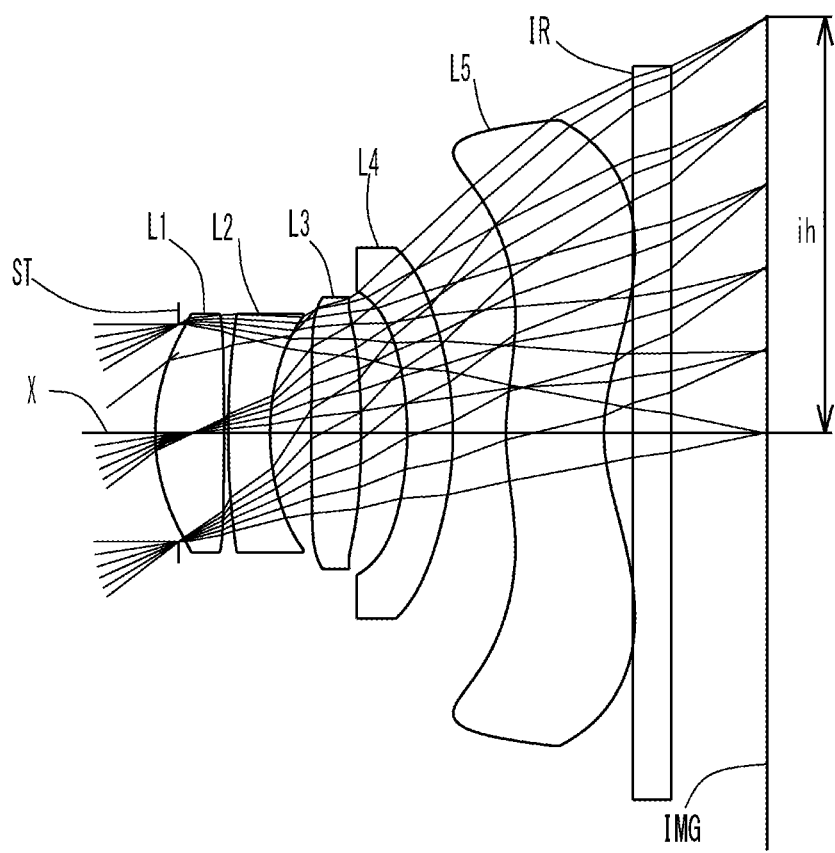
FIG. 1 is a schematic view showing the general configuration of an imaging lens in Example 1.

As shown in FIG. 1, each imaging lens according to this embodiment includes, in order from an object side to an image side, an aperture stop ST, a first lens L1 with positive refractive power having a convex surface on each of the object side and the image side, a second lens L2 with negative refractive power, a third lens L3 with positive refractive power having a convex surface on each of the object side and the image side, a fourth lens L4 with negative refractive power, and a fifth lens L5 with negative refractive power as a double-sided aspheric lens. The second lens L2 is a meniscus lens having a concave surface on the image side, the fourth lens L4 is a meniscus lens having a concave surface on the object side, and the fifth lens L5 is a meniscus lens having a concave surface near an optical axis X on the image side. A filter IR is located between the fifth lens L5 and the image plane IMG. The filter IR is omissible. According to the embodiment of the present invention, a distance on the optical axis X is defined as a distance on the assumption that the filter IR is omitted.

In each imaging lens according to this embodiment, in order to provide so-called telephoto capability, two lenses located near the image plane IMG, namely the fourth lens L4 and the fifth lens L5 have negative refractive power. In this case, a simple approach to shortening the focal length of the overall optical system of the imaging lens is to make the first lens L1 have strong positive refractive power, but if this approach is taken, it would be impossible to avoid an increase in high-order spherical aberrations or astigmatism which occurred on the first lens L1. In this embodiment, the third lens L3 with positive refractive power is located on the image side of the second lens L2 so that the required positive refractive power for the overall optical system of the imaging lens is appropriately distributed to the first lens L1 and the third lens L3. As a consequence, the refractive power of the first lens L1 is optimized to suppress excessive aberrations. In addition, the first lens L1 and the third lens L3 are biconvex lenses in which the object-side and image-side surfaces are both convex so that the positive refractive power of each of these lenses is distributed to both its surfaces and aberrations which occurred on each surface are reduced. The second lens L2 with negative refractive power corrects chromatic aberrations properly.

The imaging lens according to this embodiment satisfies conditional expressions (1) to (6) below:

$$1.5 < f3/f < 5.0 \tag{1}$$

$$-42.0 < f4/f < -8.0 \tag{2}$$

$$-8.5 < f5/f < -2.0 \tag{3}$$

$$0.8 < TLA/f < 1.2 \tag{4}$$

$$0 < r4/r5 < 0.3 \tag{5}$$

$$0 < r7/r6 < 0.5 \tag{6}$$

where
f: focal length of the overall optical system of the imaging lens
f3: focal length of the third lens L3
f4: focal length of the fourth lens L4
f5: focal length of the fifth lens L5
r4: curvature radius of the image-side surface of the second lens L2
r5: curvature radius of the object-side surface of the third lens L3
r6: curvature radius of the image-side surface of the third lens L3
r7: curvature radius of the object-side surface of the fourth lens L4
TLA: distance on the optical axis X from the objet-side surface of the first lens L1 to the image plane IMG without the filter IR or the like (total track length).

The conditional expressions (1) to (3) define appropriate ranges for the ratios of the focal lengths of the third lens L3, the fourth lens L4, and the fifth lens L5 to the focal length of the overall optical system respectively, and the imaging lens according to this embodiment satisfies these conditional expressions so that it is low-profile and corrects various aberrations properly.

The conditional expression (4) indicates a specific numerical range of the telephoto ratio which enables proper correction of aberrations, and the imaging lens according to this embodiment is designed to fall within this numerical range.

The conditional expressions (5) and (6) define appropriate curvature ratio ranges for the shapes of space between the second lens L2 and the third lens L3 and space between the third lens L3 and the fourth lens L4 which are called air lenses, respectively. The imaging lens according to this embodiment satisfies these conditional expressions so that it properly corrects high-order aberrations which occurred on the third lens L3 and the fourth lens L4 and offers high resolution while providing a wide field of view and a low F-value.

In the imaging lens according to this embodiment, the both surfaces of the fifth lens L5 are aspheric surfaces each having a pole-change point off the optical axis X. Due to the existence of the pole-change points, as the distance from the optical axis X increases, the negative refractive power of the fifth lens L5 decreases gradually and finally changes to positive refractive power in the peripheral portion. This allows correction of field curvature and makes it easy to control the angle of light rays incident on the image plane IMG.

The lens materials selected for the imaging lens according to this embodiment are plastic materials which are usable for mass production and available at low cost. A low-dispersion material is used for the first lens L1 and a high-dispersion material is used for the second lens L2 to ensure that the difference between their respective Abbe numbers at d-ray, namely vd1-vd2 is 20 or more, thereby allowing chromatic aberrations to be properly corrected.

In this embodiment, all the lens surfaces are aspheric. The aspheric shapes of these lens surfaces are expressed by Equation 1, where Z denotes an axis in the optical axis direction, H denotes a height perpendicular to the optical axis, k denotes a conic constant, and A4, A6, A8, A10, A12, A14, and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

Equation 1

Next, examples of the imaging lens according to this embodiment will be explained. In each example, f denotes the focal length of the overall optical system of the imaging lens, Fno denotes an F-number, ω denotes a half field of view, ih denotes a maximum image height, TLA denotes a total track length with the filter IR removed, and bf denotes a back focus with the filter IR removed. i denotes a surface number counted from the object side, r denotes a curvature radius, d denotes the distance on the optical axis between lens surfaces (surface distance), Nd denotes a refractive index at d-ray (reference wavelength), and vd denotes an Abbe number at d-ray. As for aspheric surfaces, an asterisk (*) after surface number i indicates that the surface concerned is an aspheric surface.

EXAMPLE 1

The basic lens data of Example 1 is shown below in Table 1.

TABLE 1

Example 1 in mm
f = 2.94
Fno = 2.45
ω(°) = 37.5
ih = 2.30
TLA = 3.30
bf = 0.82

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.130 | | |
| 2* | 1.112 | 0.380 | 1.544 | 55.57 |
| 3* | −8.040 | 0.024 | | |
| 4* | 8.036 | 0.230 | 1.635 | 23.97 |
| 5* | 1.399 | 0.226 | | |
| 6* | 9.949 | 0.275 | 1.544 | 55.57 |
| 7* | −7.040 | 0.255 | | |
| 8* | −1.778 | 0.253 | 1.544 | 55.57 |
| 9* | −1.934 | 0.293 | | |
| 10* | 1.564 | 0.540 | 1.535 | 56.16 |
| 11* | 1.030 | 0.200 | | |
| 12 | Infinity | 0.210 | 1.517 | 64.20 |
| 13 | Infinity | 0.489 | | |
| Image Plane | Infinity | | | |

TABLE 1-continued

Example 1

Constituent Lens Data

| Lens | Start Surface | Focal Length |
|---|---|---|
| 1 | 2 | 1.823 |
| 2 | 4 | −2.704 |
| 3 | 6 | 7.625 |
| 4 | 8 | −94.635 |
| 5 | 10 | −8.692 |

Aspheric Surface Data

| | 2nd Surface | 3rd Surface | 4th Surface | 5th Surface | 6th Surface |
|---|---|---|---|---|---|
| k | −1.815E+00 | 0.000E+00 | −8.867E+01 | 0.000E+00 | 8.410E+01 |
| A4 | 1.548E−01 | 3.507E−01 | 2.943E−01 | 4.286E−03 | −2.086E−01 |
| A6 | −1.182E−01 | −8.403E−01 | −3.518E−01 | 5.713E−01 | 3.009E−01 |
| A8 | 5.371E−01 | −1.443E−01 | −9.307E−01 | −9.793E−01 | 2.408E−01 |
| A10 | −1.807E+00 | 1.266E+00 | 1.522E+00 | 1.034E+00 | 8.371E−01 |
| A12 | 8.084E−01 | −1.358E+00 | 1.342E+00 | 5.561E−01 | −1.491E+00 |
| A14 | 0.000E+00 | 0.000E+00 | −1.593E+00 | −1.140E+00 | 1.031E+00 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 6.164E+01 | −5.156E−01 | 1.065E+00 | −1.772E+01 | −6.093E+00 |
| A4 | −2.050E−01 | 1.611E−01 | 3.864E−02 | −2.691E−01 | −1.678E−01 |
| A6 | 8.095E−02 | −7.540E−01 | 1.115E−01 | 1.118E−01 | 8.017E−02 |
| A8 | 1.647E−01 | 6.123E−01 | −1.838E−01 | −6.772E−03 | −3.220E−02 |
| A10 | −4.380E−01 | −4.285E−01 | 3.678E−02 | −5.525E−03 | 5.922E−03 |
| A12 | 7.269E−01 | −2.989E−01 | 2.443E−02 | −2.248E−03 | −3.741E−05 |
| A14 | 1.334E+00 | 6.738E−02 | 1.425E−02 | 2.855E−04 | −1.374E−04 |
| A16 | 0.000E+00 | −7.831E−01 | −2.402E−02 | 3.445E−04 | 1.760E−07 |

As shown in Table 2 below, the imaging lens in Example 1 satisfies all the conditional expressions (1) to (6).

TABLE 2

| (1) f3/f | 2.60 |
|---|---|
| (2) f4/f | −32.21 |
| (3) f5/f | −2.96 |
| (4) TLA/f | 1.12 |
| (5) r4/r5 | 0.14 |
| (6) r7/r6 | 0.25 |

Figure 2:
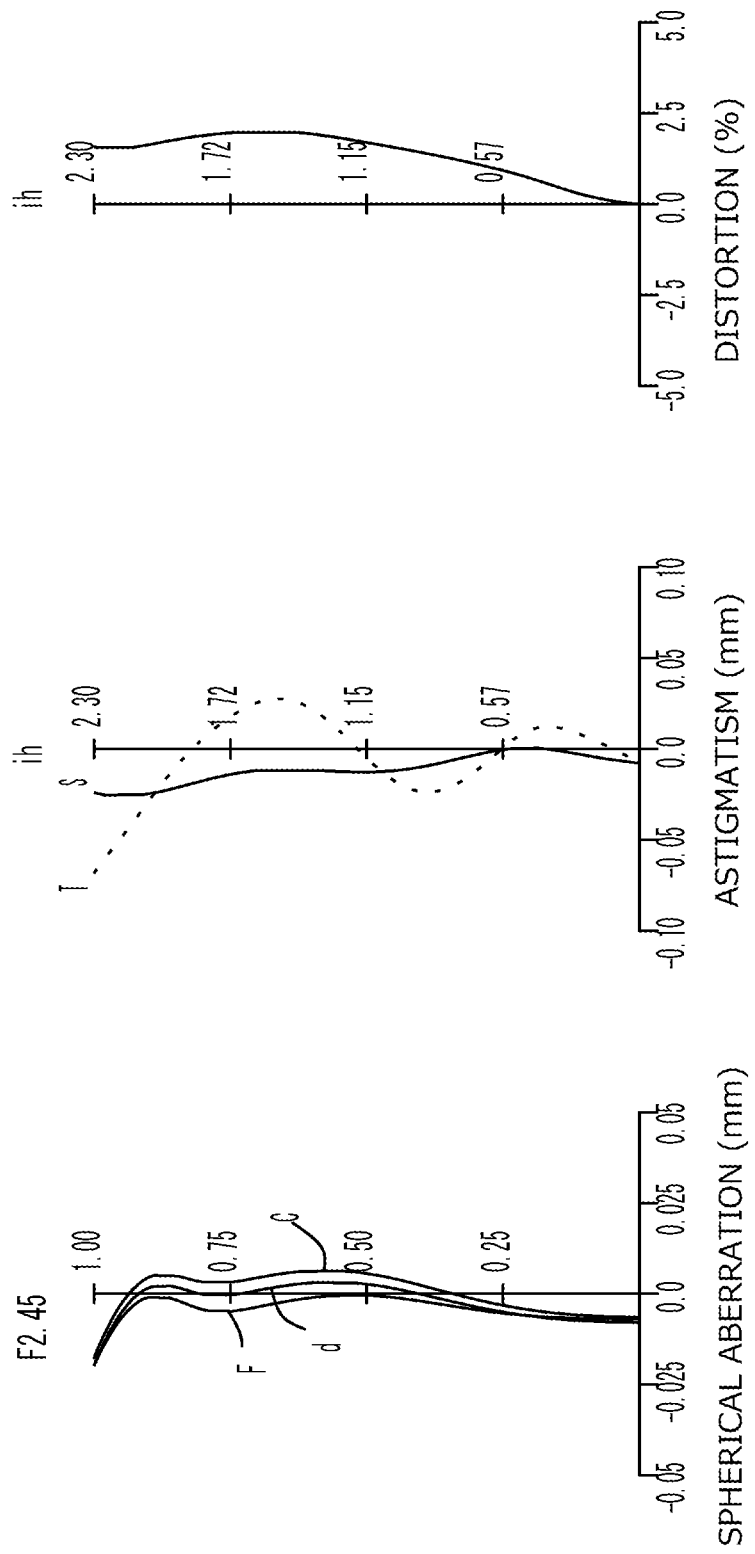
FIG. 2 shows spherical aberration, astigmatism, and distortion of the imaging lens in Example 1.
Figure 3:
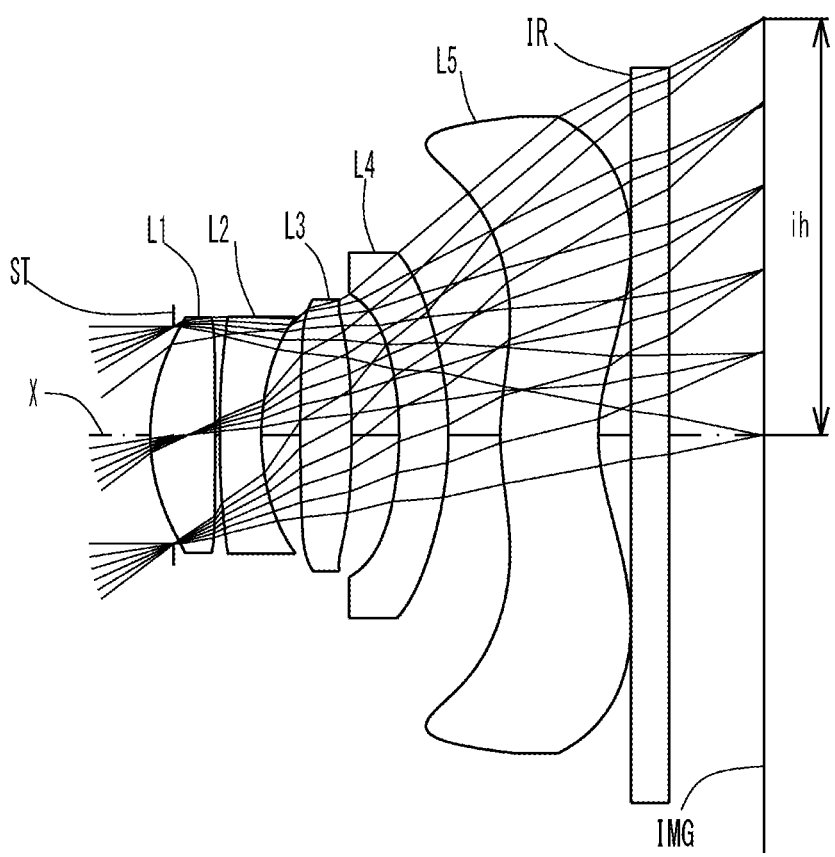
FIG. 3 is a schematic view showing the general configuration of an imaging lens in Example 2.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration on sagittal image surface S at d-ray and the amount of aberration on tangential image surface T at d-ray (the same is true for FIGS. 4, 6, 8, 10, 12, and 14). As shown in FIG. 2, each aberration is corrected properly.

In Example 1, total track length TLA is 3.30 mm, and thus the imaging lens is low-profile though it uses five constituent lenses. Also, the imaging lens offers a wide field of view of about 75 degrees and high brightness with an F-value of 2.5 or less.

EXAMPLE 2

The basic lens data of Example 2 is shown below in Table 3.

TABLE 3

Example 2 in mm
f = 2.94
Fno = 2.45
ω(°) = 37.5
ih = 2.30
TLA = 3.31
bf = 0.85

Surface Data

| Surface No. i | Curvature Radius r | Surface Distance d | Refractive Index Nd | Abbe Number νd |
|---|---|---|---|---|
| (Object Surface) | Infinity | Infinity | | |
| 1 (Stop) | Infinity | −0.130 | | |
| 2* | 1.114 | 0.360 | 1.544 | 55.57 |
| 3* | −8.285 | 0.024 | | |
| 4* | 8.421 | 0.230 | 1.635 | 23.97 |

TABLE 3-continued

| | Example 2 | | | |
|---|---|---|---|---|
| 5* | 1.400 | 0.215 | | |
| 6* | 8.294 | 0.282 | 1.544 | 55.57 |
| 7* | −6.616 | 0.263 | | |
| 8* | −1.771 | 0.272 | 1.544 | 55.57 |
| 9* | −1.966 | 0.287 | | |
| 10* | 1.561 | 0.540 | 1.535 | 56.16 |
| 11* | 1.0247 | 0.180 | | |
| 12 | Infinity | 0.210 | 1.517 | 64.20 |
| 13 | Infinity | 0.523 | | |
| Image Plane | Infinity | | | |

Constituent Lens Data

| Lens | Start Surface | Focal Length |
|---|---|---|
| 1 | 2 | 1.831 |
| 2 | 4 | −2.679 |
| 3 | 6 | 6.813 |
| 4 | 8 | −64.700 |
| 5 | 10 | −8.587 |

Aspheric Surface Data

| | 2nd Surface | 3rd Surface | 4th Surface | 5th Surface | 6th Surface |
|---|---|---|---|---|---|
| k | −1.833E+00 | 0.000E+00 | −9.153E+01 | 0.000E+00 | 8.501E+01 |
| A4 | 1.536E−01 | 3.515E−01 | 2.937E−01 | 3.915E−03 | −2.085E−01 |
| A6 | −1.202E−01 | −8.398E−01 | −3.507E−01 | 5.710E−01 | 3.019E−01 |
| A8 | 5.299E−01 | −1.431E−01 | −9.248E−01 | −9.806E−01 | 2.411E−01 |
| A10 | −1.836E+00 | 1.277E+00 | 1.537E+00 | 1.012E+00 | 8.279E−01 |
| A12 | 7.104E−01 | −1.318E+00 | 1.389E+00 | 4.396E−01 | −1.542E+00 |
| A14 | 0.000E+00 | 0.000E+00 | −1.427E+00 | −1.301E+00 | 8.343E−01 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 5.951E+01 | −4.781E−01 | 1.007E+00 | −1.657E+01 | −6.059E+00 |
| A4 | −2.034E−01 | 1.602E−01 | 4.013E−02 | −2.696E−01 | −1.620E−01 |
| A6 | 8.271E−02 | −7.586E−01 | 1.137E−01 | 1.116E−01 | 8.049E−02 |
| A8 | 1.645E−01 | 6.248E−01 | −1.831E−01 | −7.084E−03 | −3.218E−02 |
| A10 | −4.388E−01 | −4.188E−01 | 3.814E−02 | −5.749E−03 | 5.902E−03 |
| A12 | 7.403E−01 | −2.881E−01 | 2.579E−02 | −2.362E−03 | −3.198E−05 |
| A14 | 1.414E+00 | 6.192E−02 | 1.484E−02 | 2.360E−04 | −1.356E−04 |
| A16 | 0.000E+00 | −8.097E−01 | −2.438E−02 | 3.235E−04 | 1.194E−06 |

As shown in Table 4 below, the imaging lens in Example 2 satisfies all the conditional expressions (1) to (6).

TABLE 4

| (1) f3/f | 2.32 |
|---|---|
| (2) f4/f | −22.01 |
| (3) f5/f | −2.92 |
| (4) TLA/f | 1.12 |
| (5) r4/r5 | 0.17 |
| (6) r7/r6 | 0.27 |

Figure 4:
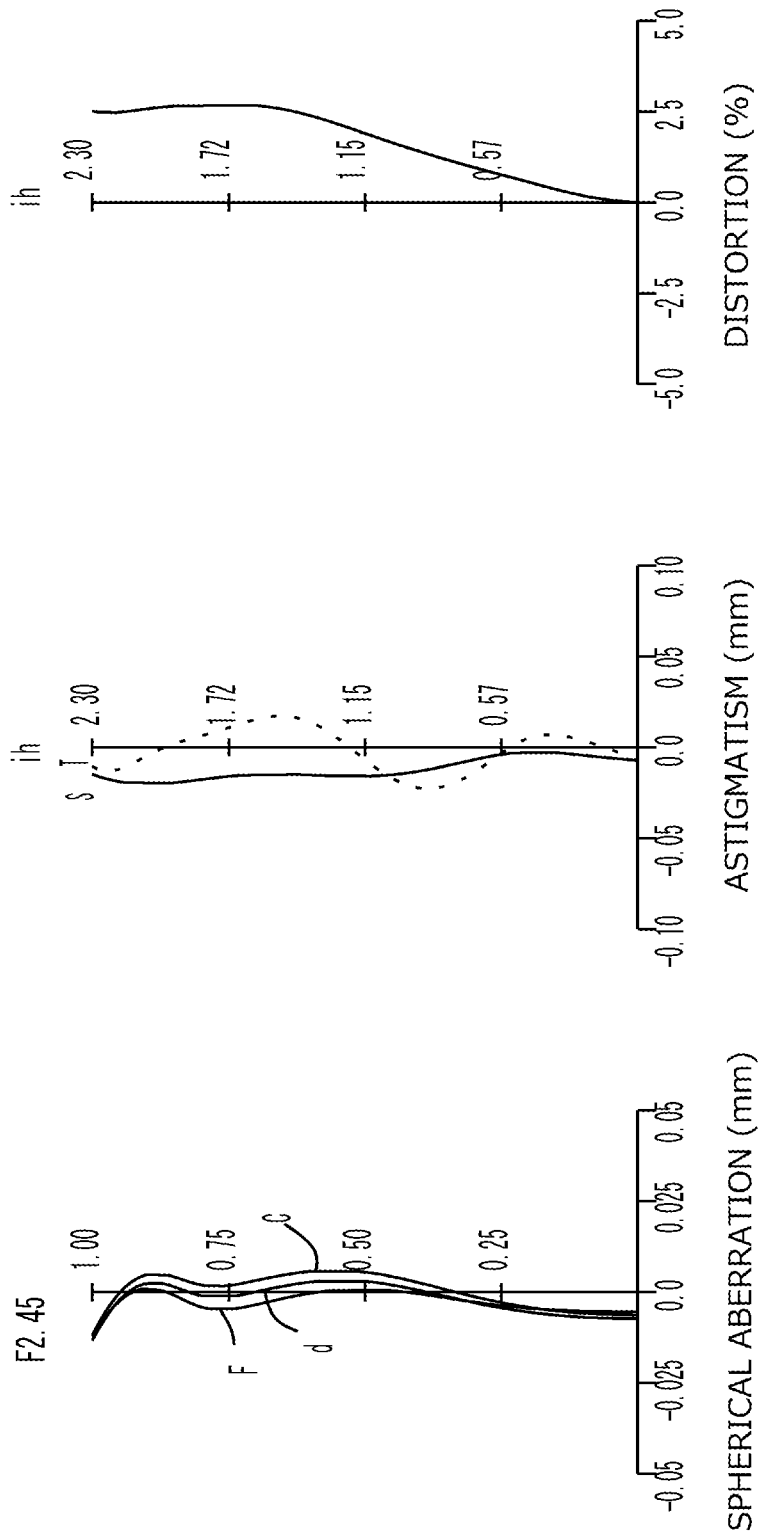
FIG. 4 shows spherical aberration, astigmatism, and distortion of the imaging lens in Example 2.
Figure 5:
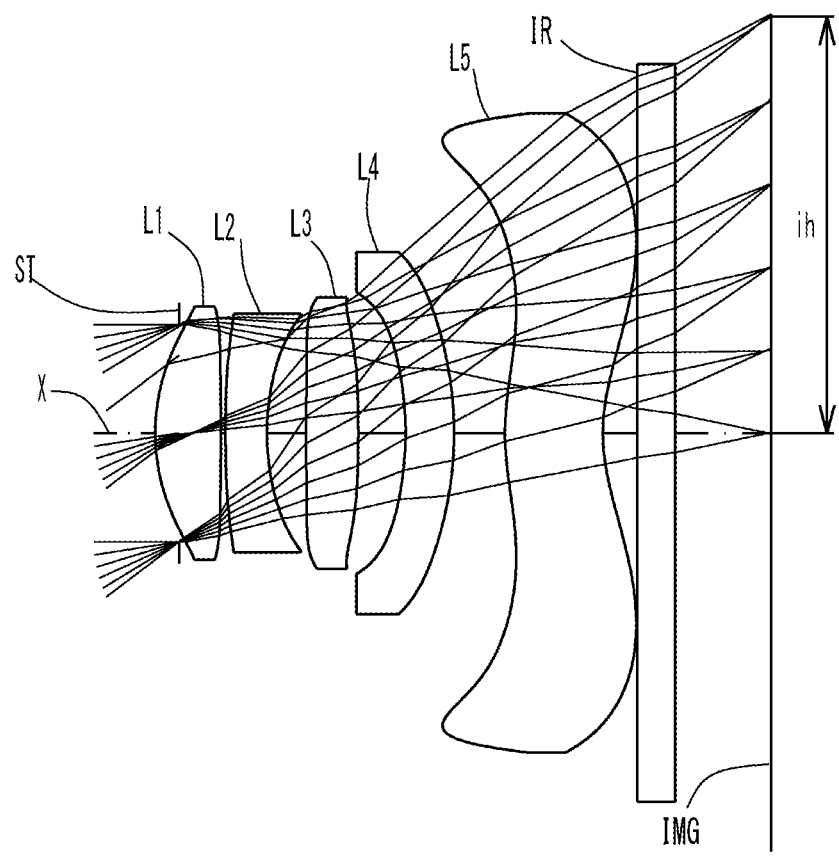
FIG. 5 is a schematic view showing the general configuration of an imaging lens in Example 3.

FIG. 4 shows spherical aberration (mm), astigmatism (mm), and distortion (%) of the imaging lens in Example 2. As shown in FIG. 4, each aberration is corrected properly.

In Example 2, total track length TLA is 3.31 mm, and thus the imaging lens is low-profile though it uses five constituent lenses. Also, the imaging lens offers a wide field of view of about 75 degrees and high brightness with an F-value of 2.5 or less.

EXAMPLE 3

The basic lens data of Example 3 is shown below in Table 5.

TABLE 5

| Example 3 |
|---|
| in mm |
| f = 2.93 |
| Fno = 2.44 |
| ω(°) = 37.6 |
| ih = 2.30 |
| TLA = 3.32 |
| bf = 0.85 |

TABLE 5-continued

Example 3

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.130 | | |
| 2* | 1.112 | 0.363 | 1.544 | 55.57 |
| 3* | −8.037 | 0.024 | | |
| 4* | 8.252 | 0.230 | 1.635 | 23.97 |
| 5* | 1.421 | 0.215 | | |
| 6* | 13.123 | 0.289 | 1.544 | 55.57 |
| 7* | −7.101 | 0.260 | | |
| 8* | −1.790 | 0.269 | 1.544 | 55.57 |
| 9* | −1.948 | 0.281 | | |
| 10* | 1.467 | 0.540 | 1.535 | 56.16 |
| 11* | 1.018 | 0.190 | | |
| 12 | Infinity | 0.210 | 1.517 | 64.20 |
| 13 | Infinity | 0.528 | | |
| Image Plane | Infinity | | | |

Constituent Lens Data

| Lens | Start Surface | Focal Length |
|---|---|---|
| 1 | 2 | 1.822 |
| 2 | 4 | −2.740 |
| 3 | 6 | 8.516 |
| 4 | 8 | −101.049 |
| 5 | 10 | −10.705 |

Aspheric Surface Data

| | 2nd Surface | 3rd Surface | 4th Surface | 5th Surface | 6th Surface |
|---|---|---|---|---|---|
| k | −1.820E+00 | 0.000E+00 | −8.287E+01 | 0.000E+00 | 8.159E+01 |
| A4 | 1.546E−01 | 3.502E−01 | 2.954E−01 | 4.459E−03 | −2.059E−01 |
| A6 | −1.174E−01 | −8.411E−01 | −3.481E−01 | 5.797E−01 | 3.044E−01 |
| A8 | 5.350E−01 | −1.449E−01 | −9.160E−01 | −9.623E−01 | 2.540E−01 |
| A10 | −1.832E+00 | 1.278E+00 | 1.563E+00 | 1.035E+00 | 8.770E−01 |
| A12 | 6.917E−01 | −1.288E+00 | 1.430E+00 | 5.311E−01 | −1.413E+00 |
| A14 | 0.000E+00 | 0.000E+00 | −1.485E+00 | −8.180E−01 | 1.076E+00 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 6.088E+01 | −4.286E−01 | 1.163E+00 | −1.356E+01 | −5.698E+00 |
| A4 | −2.050E−01 | 1.616E−01 | 3.392E−02 | −2.619E−01 | −1.646E−01 |
| A6 | 8.499E−02 | −7.691E−01 | 1.096E−01 | 1.130E−01 | 8.086E−02 |
| A8 | 1.632E−01 | 6.166E−01 | −1.851E−01 | −7.046E−03 | −3.211E−02 |
| A10 | −4.477E−01 | −4.091E−01 | 3.648E−02 | −5.748E−03 | 5.963E−03 |
| A12 | 7.227E−01 | −2.883E−01 | 2.362E−02 | −2.364E−03 | −1.548E−05 |
| A14 | 1.384E+00 | 3.314E−02 | 1.186E−02 | 2.250E−04 | −1.355E−04 |
| A16 | 0.000E+00 | −9.256E−01 | −2.775E−02 | 3.075E−04 | −4.675E−07 |

As shown in Table 6 below, the imaging lens in Example 3 satisfies all the conditional expressions (1) to (6).

TABLE 6

| (1) f3/f | 2.90 |
|---|---|
| (2) f4/f | −34.46 |
| (3) f5/f | −3.65 |
| (4) TLA/f | 1.13 |
| (5) r4/r5 | 0.11 |
| (6) r7/r6 | 0.25 |

Figure 6:
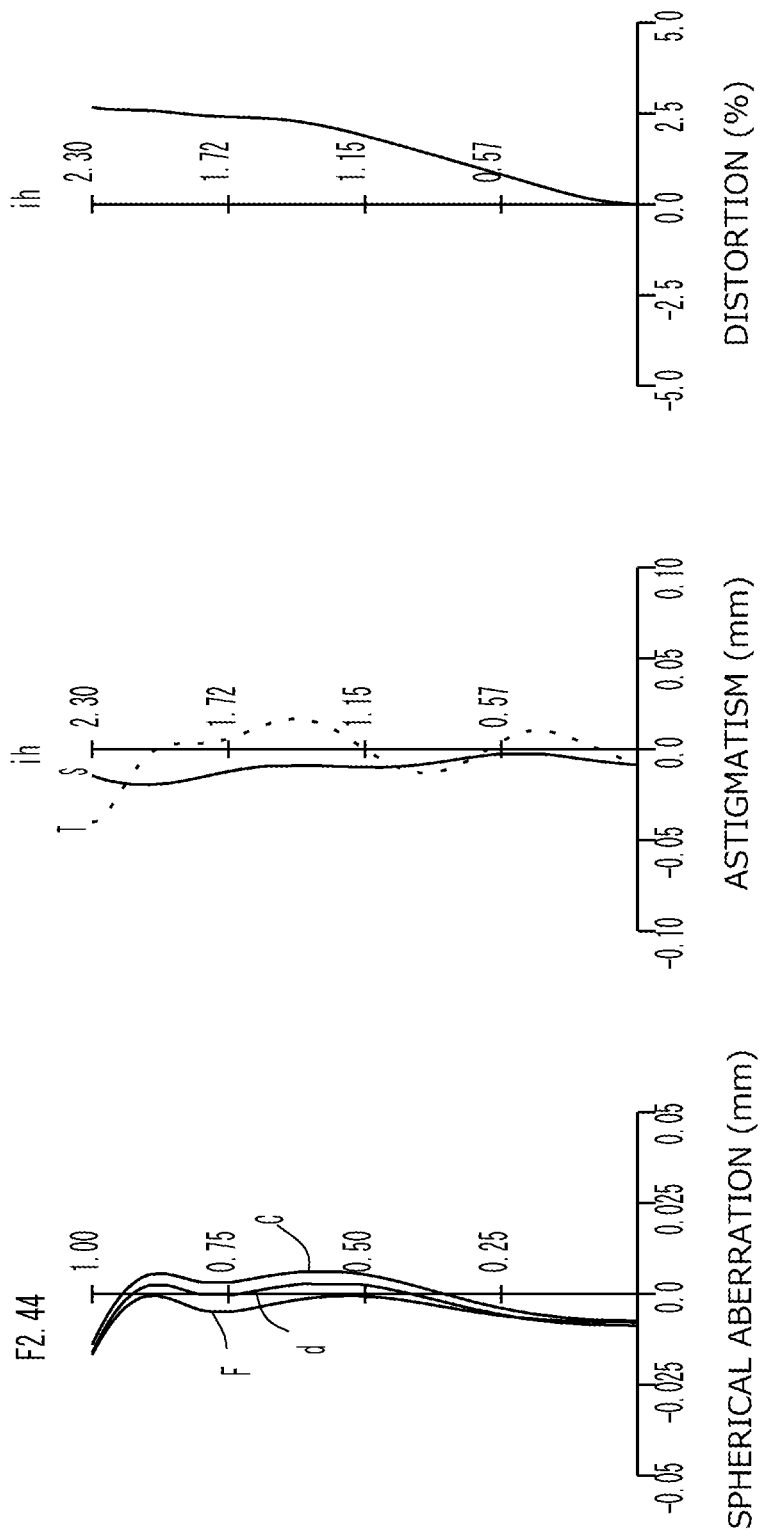
FIG. 6 shows spherical aberration, astigmatism, and distortion of the imaging lens in Example 3.
Figure 7:
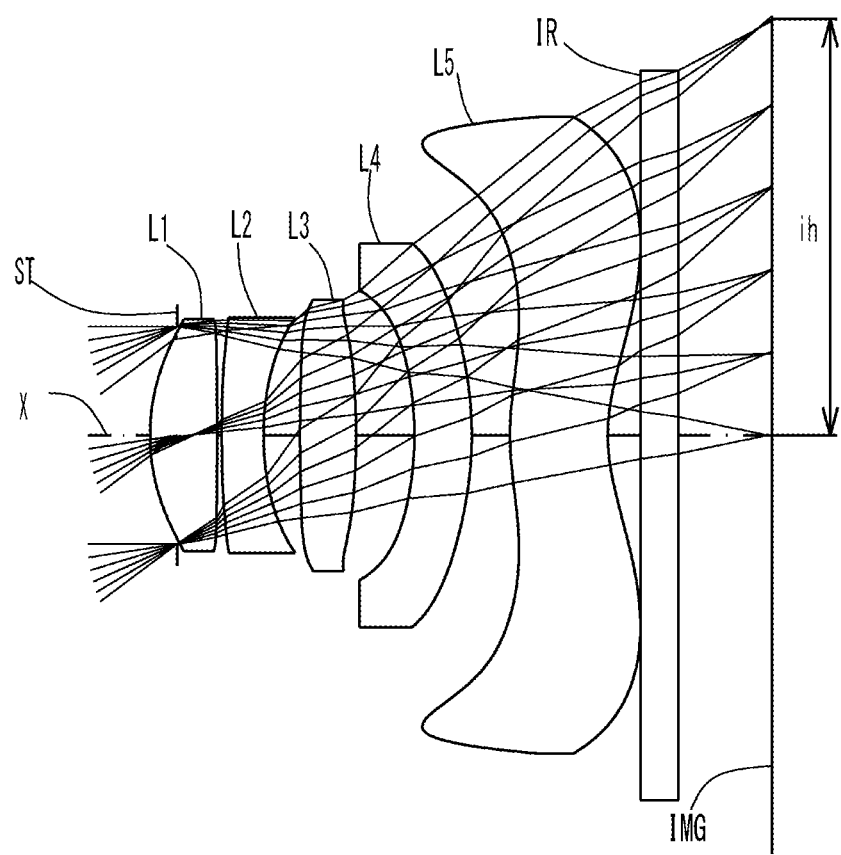
FIG. 7 is a schematic view showing the general configuration of an imaging lens in Example 4.

FIG. 6 shows spherical aberration (mm), astigmatism (mm), and distortion (%) of the imaging lens in Example 3. As shown in FIG. 6, each aberration is corrected properly.

In Example 3, total track length TLA is 3.32 mm, and thus the imaging lens is low-profile though it uses five constituent lenses. Also, the imaging lens offers a wide field of view of about 75 degrees and high brightness with an F-value of 2.5 or less.

EXAMPLE 4

The basic lens data of Example 4 is shown below in Table 7.

TABLE 7

Example 4 in mm
f = 2.96
Fno = 2.47
ω(°) = 37.2
ih = 2.30
TLA = 3.35
bf = 0.82

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.150 | | |
| 2* | 1.127 | 0.371 | 1.544 | 55.57 |
| 3* | −8.495 | 0.024 | | |
| 4* | 11.125 | 0.230 | 1.635 | 23.97 |
| 5* | 1.469 | 0.201 | | |
| 6* | 7.080 | 0.309 | 1.544 | 55.57 |
| 7* | −5.825 | 0.324 | | |
| 8* | −1.735 | 0.316 | 1.544 | 55.57 |
| 9* | −2.060 | 0.211 | | |
| 10* | 1.561 | 0.540 | 1.535 | 56.16 |
| 11* | 1.017 | 0.180 | | |
| 12 | Infinity | 0.210 | 1.517 | 64.20 |
| 13 | Infinity | 0.517 | | |
| Image Plane | Infinity | | | |

Constituent Lens Data

| Lens | Start Surface | Focal Length |
|---|---|---|
| 1 | 2 | 1.854 |
| 2 | 4 | −2.690 |
| 3 | 6 | 5.926 |
| 4 | 8 | −30.851 |
| 5 | 10 | −8.337 |

Aspheric Surface Data

| | 2nd Surface | 3rd Surface | 4th Surface | 5th Surface | 6th Surface |
|---|---|---|---|---|---|
| k | −1.894E+00 | 0.000E+00 | −9.417E+01 | 0.000E+00 | 7.200E+01 |
| A4 | 1.501E−01 | 3.529E−01 | 2.921E−01 | −8.868E−03 | −2.101E−01 |
| A6 | −1.209E−01 | −8.350E−01 | −3.588E−01 | 5.718E−01 | 2.834E−01 |
| A8 | 5.423E−01 | −1.405E−01 | −9.356E−01 | −9.592E−01 | 2.162E−01 |
| A10 | −1.799E+00 | 1.269E+00 | 1.540E+00 | 9.606E−01 | 8.466E−01 |
| A12 | 7.787E−01 | −1.314E+00 | 1.432E+00 | 1.948E−01 | −1.489E+00 |
| A14 | 0.000E+00 | 0.000E+00 | −1.435E+00 | −4.217E−01 | 6.432E−01 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 5.051E+01 | −3.949E−01 | 1.131E+00 | −2.014E+01 | −6.199E+00 |
| A4 | −1.949E−01 | 1.581E−01 | 3.460E−02 | −2.564E−01 | −1.603E−01 |
| A6 | 1.059E−01 | −7.940E−01 | 1.066E−01 | 1.139E−01 | 8.129E−02 |
| A8 | 1.976E−01 | 6.423E−01 | −1.839E−01 | −9.099E−03 | −3.247E−02 |
| A10 | −4.079E−01 | −3.926E−01 | 3.955E−02 | −7.088E−03 | 5.892E−03 |
| A12 | 7.447E−01 | −2.717E−01 | 2.668E−02 | −2.805E−03 | −2.741E−05 |
| A14 | 1.380E+00 | 1.151E−01 | 1.482E−02 | 2.194E−04 | −1.314E−04 |
| A16 | 0.000E+00 | −5.366E−01 | −2.354E−02 | 4.311E−04 | 2.717E−06 |

As shown in Table 8 below, the imaging lens in Example 4 satisfies all the conditional expressions (1) to (6).

TABLE 8

| (1) f3/f | 2.00 |
|---|---|
| (2) f4/f | −10.42 |
| (3) f5/f | −2.81 |
| (4) TLA/f | 1.13 |
| (5) r4/r5 | 0.21 |
| (6) r7/r6 | 0.30 |

Figure 8:
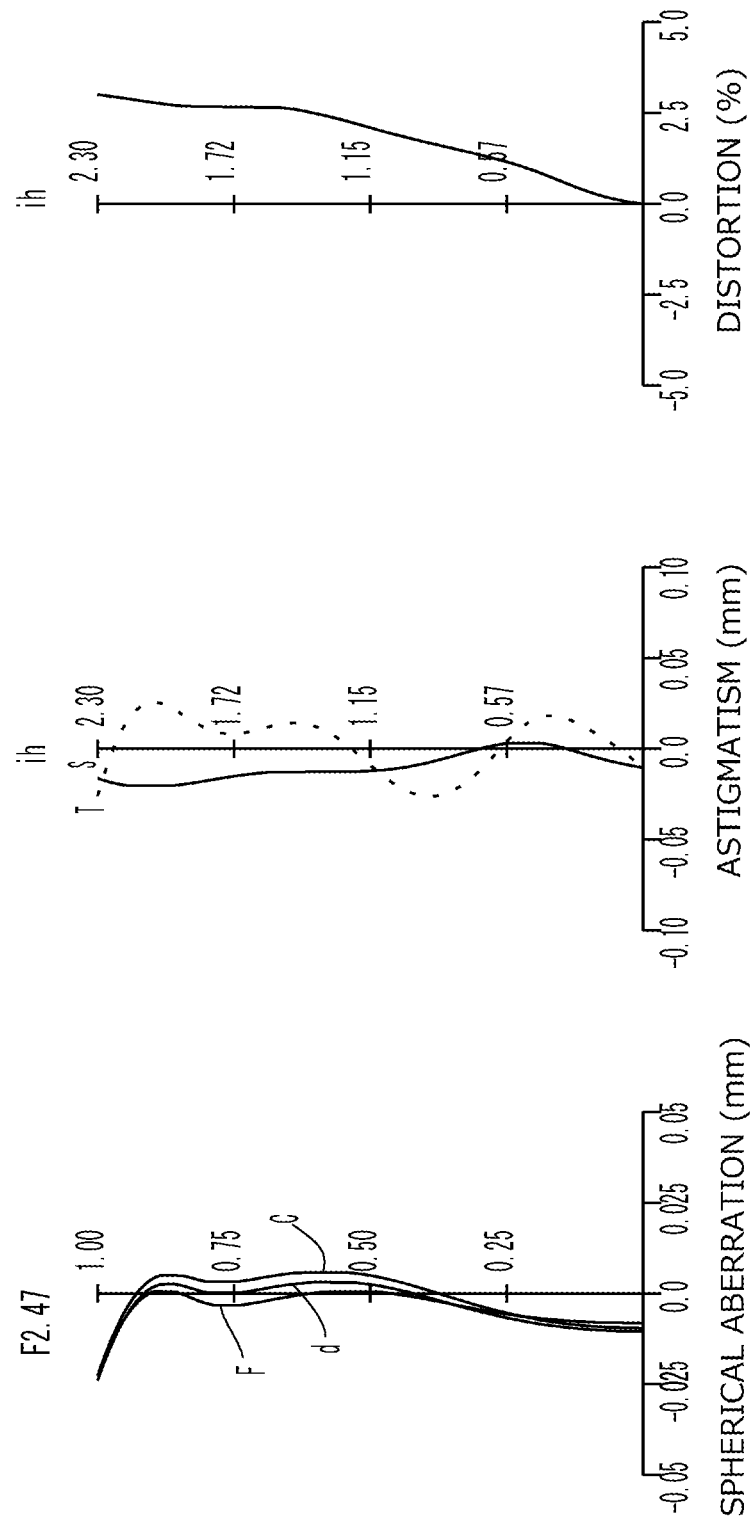
FIG. 8 shows spherical aberration, astigmatism, and distortion of the imaging lens in Example 4.
Figure 9:
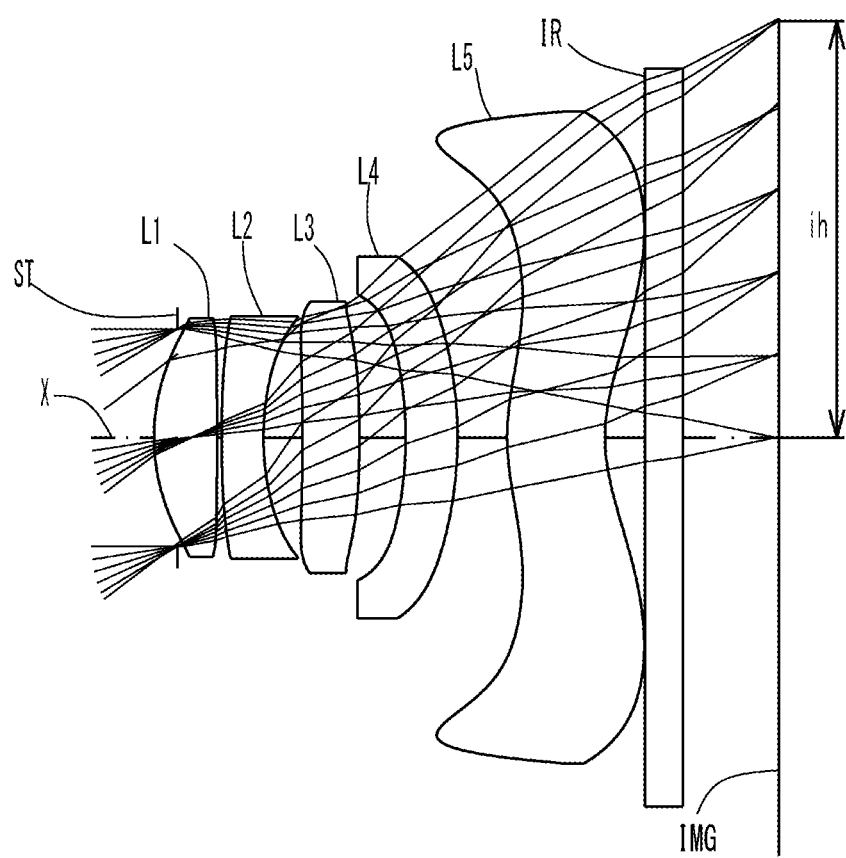
FIG. 9 is a schematic view showing the general configuration of an imaging lens in Example 5.

FIG. 8 shows spherical aberration (mm), astigmatism (mm), and distortion (%) of the imaging lens in Example 4. As shown in FIG. 8, each aberration is corrected properly.

In Example 4, total track length TLA is 3.35 mm, and thus the imaging lens is low-profile though it uses five constituent lenses. Also, the imaging lens offers a wide field of view of about 75 degrees and high brightness with an F-value of 2.5 or less.

EXAMPLE 5

The basic lens data of Example 5 is shown below in Table 9.

TABLE 9

Example 5 in mm
f = 2.93
Fno = 2.44
ω(°) = 37.6
ih = 2.30
TLA = 3.36
bf = 0.88

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.130 | | |
| 2* | 1.115 | 0.350 | 1.544 | 55.57 |
| 3* | −8.196 | 0.024 | | |
| 4* | 10.565 | 0.230 | 1.635 | 23.97 |
| 5' | 1.525 | 0.213 | | |
| 6* | 74.455 | 0.316 | 1.544 | 55.57 |
| 7* | −6.964 | 0.256 | | |
| 8* | −2.085 | 0.286 | 1.544 | 55.57 |
| 9* | −2.272 | 0.274 | | |
| 10* | 1.281 | 0.540 | 1.535 | 56.16 |
| 11* | 0.969 | 0.220 | | |
| 12 | Infinity | 0.210 | 1.517 | 64.20 |
| 13 | Infinity | 0.524 | | |
| Image Plane | Infinity | | | |

Constituent Lens Data

| Lens | Start Surface | Focal Length |
|---|---|---|
| 1 | 2 | 1.829 |
| 2 | 4 | −2.836 |
| 3 | 6 | 11.726 |
| 4 | 8 | −100.345 |
| 5 | 10 | −18.703 |

Aspheric Surface Data

| | 2nd Surface | 3rd Surface | 4th Surface | 5th Surface | 6th Surface |
|---|---|---|---|---|---|
| k | −1.845E+00 | 0.000E+00 | −5.025E+01 | 0.000E+00 | 0.000E+00 |
| A4 | 1.539E−01 | 3.465E−01 | 2.992E−01 | 1.759E−02 | −2.157E−01 |
| A6 | −1.110E−01 | −8.450E−01 | −3.397E−01 | 6.036E−01 | 2.816E−01 |
| A8 | 5.362E−01 | −1.442E−01 | −9.036E−01 | −9.397E−01 | 2.275E−01 |
| A10 | −1.868E+00 | 1.290E+00 | 1.596E+00 | 1.015E+00 | 8.939E−01 |
| A12 | 5.330E−01 | −1.231E+00 | 1.537E+00 | 5.440E−01 | −1.262E+00 |
| A14 | 0.000E+00 | 0.000E+00 | −1.217E+00 | −2.026E−02 | 1.476E+00 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 6.473E+01 | −1.267E+00 | 1.889E+00 | −1.002E+01 | −5.011E+00 |
| A4 | −1.968E−01 | 1.776E−01 | −1.898E−04 | −2.472E−01 | −1.632E−01 |
| A6 | 8.262E−02 | −8.120E−01 | 1.044E−01 | 1.089E−01 | 8.507E−02 |
| A8 | 1.447E−01 | 5.421E−01 | −1.906E−01 | −8.597E−03 | −3.189E−02 |
| A10 | −4.790E−01 | −3.670E−01 | 2.779E−02 | −6.107E−03 | 5.692E−03 |
| A12 | 6.545E−01 | −1.982E−01 | 1.507E−02 | −2.431E−03 | −8.878E−05 |
| A14 | 1.181E+00 | 6.121E−02 | 6.259E−03 | 2.178E−04 | −1.315E−04 |
| A16 | 0.000E+00 | −1.313E+00 | −3.059E−02 | 3.168E−04 | 7.745E−06 |

As shown in Table 10 below, the imaging lens in Example 5 satisfies all the conditional expressions (1) to (6).

TABLE 10

| | | |
|---|---|---|
| (1) | f3/f | 4.01 |
| (2) | f4/f | −34.29 |
| (3) | f5/f | −6.39 |
| (4) | TLA/f | 1.15 |
| (5) | r4/r5 | 0.02 |
| (6) | r7/r6 | 0.30 |

Figure 10:
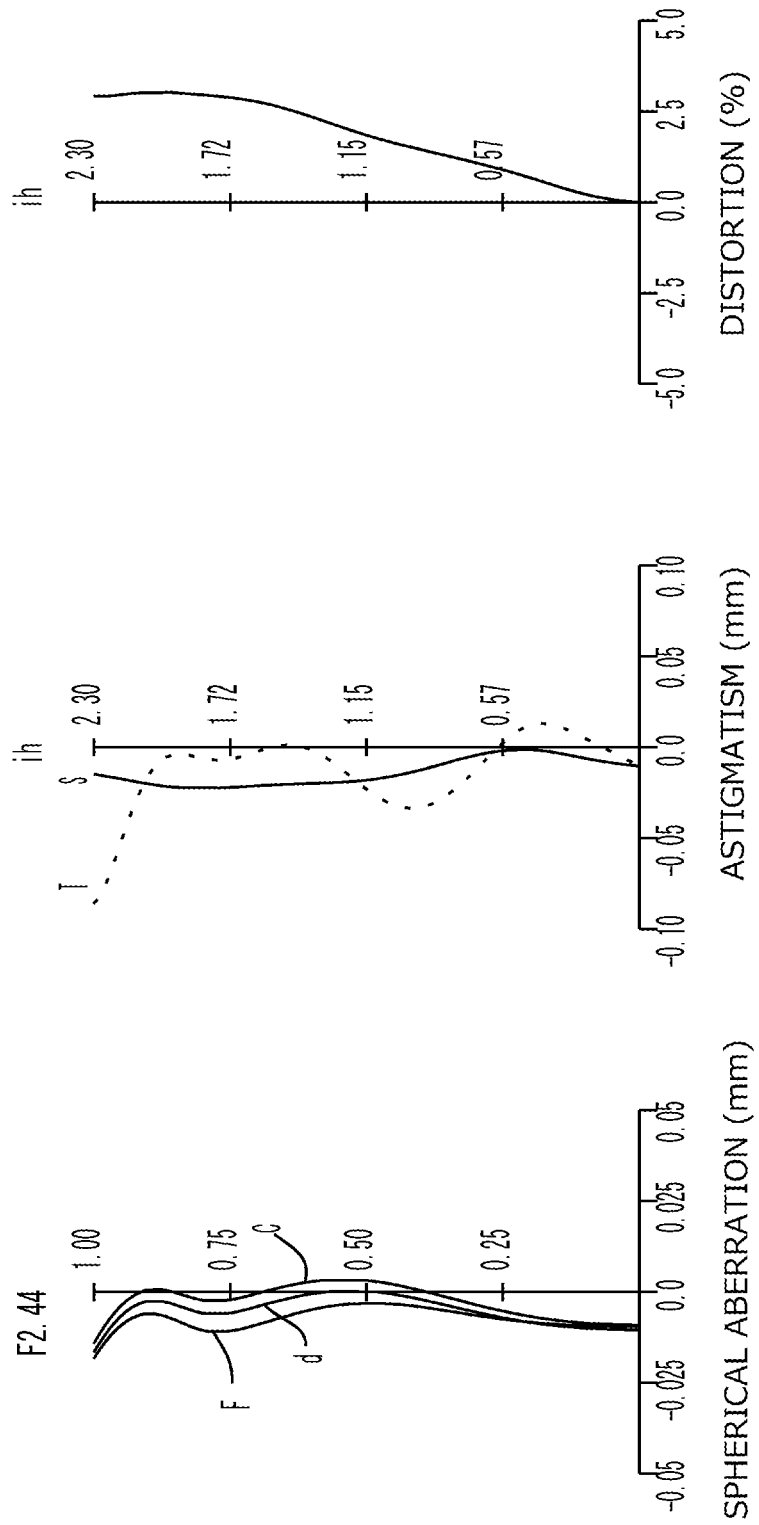
FIG. 10 shows spherical aberration, astigmatism, and distortion of the imaging lens in Example 5.
Figure 11:
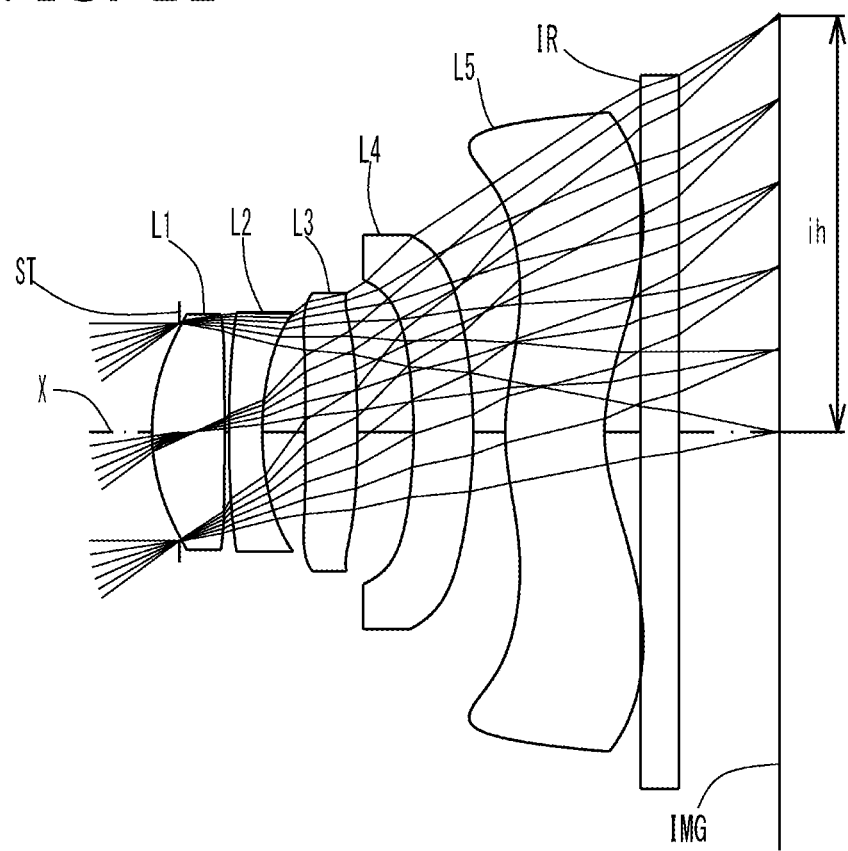
FIG. 11 is a schematic view showing the general configuration of an imaging lens in Example 6.

FIG. 10 shows spherical aberration (mm), astigmatism (mm), and distortion (%) of the imaging lens in Example 5. As shown in FIG. 10, each aberration is corrected properly.

In Example 5, total track length TLA is 3.36 mm, and thus the imaging lens is low-profile though it uses five constituent lenses. Also, the imaging lens offers a wide field of view of about 75 degrees and high brightness with an F-value of 2.5 or less.

EXAMPLE 6

The basic lens data of Example 6 is shown below in Table 11.

TABLE 11

Example 6 in mm
f = 2.94
Fno = 2.45
ω(°) = 37.5
ih = 2.30
TLA = 3.38
bf = 0.88

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.150 | | |
| 2* | 1.135 | 0.402 | 1.544 | 55.57 |
| 3* | −7.758 | 0.024 | | |
| 4* | 14.361 | 0.182 | 1.635 | 23.97 |
| 5* | 1.664 | 0.237 | | |
| 6* | 60.792 | 0.288 | 1.544 | 55.57 |
| 7* | −7.344 | 0.310 | | |
| 8* | −2.580 | 0.329 | 1.544 | 55.57 |
| 9* | −3.013 | 0.177 | | |
| 10* | 1.320 | 0.548 | 1.535 | 56.16 |
| 11* | 1.009 | 0.200 | | |
| 12 | Infinity | 0.210 | 1.517 | 64.20 |
| 13 | Infinity | 0.555 | | |
| Image Plane | Infinity | | | |

Constituent Lens Data

| Lens | Start Surface | Focal Length |
|---|---|---|
| 1 | 2 | 1.850 |
| 2 | 4 | −2.980 |
| 3 | 6 | 12.067 |
| 4 | 8 | −45.123 |
| 5 | 10 | −20.646 |

Aspheric Surface Data

| | 2nd Surface | 3rd Surface | 4th Surface | 5th Surface | 6th Surface |
|---|---|---|---|---|---|
| k | −1.922E+00 | 0.000E+00 | −5.159E+01 | 0.000E+00 | 0.000E+00 |
| A4 | 1.500E−01 | 3.445E−01 | 3.002E−01 | 1.546E−02 | −2.204E−01 |
| A6 | −1.096E−01 | −8.470E−01 | −3.382E−01 | 5.754E−01 | 2.471E−01 |
| A8 | 5.574E−01 | −1.350E−01 | −9.178E−01 | −1.004E+00 | 1.703E−01 |
| A10 | −1.784E+00 | 1.325E+00 | 1.536E+00 | 9.362E−01 | 8.341E−01 |
| A12 | 7.968E−01 | −1.202E+00 | 1.414E+00 | 5.633E−01 | −1.304E+00 |
| A14 | 0.000E+00 | 0.000E+00 | −1.325E+00 | 5.135E−01 | 1.425E+00 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 6.490E+01 | −3.450E+00 | 1.976E+00 | −1.073E+01 | −4.867E+00 |
| A4 | −2.026E−01 | 1.997E−01 | 8.264E−03 | −2.461E−01 | −1.640E−01 |
| A6 | 1.008E−01 | −7.705E−01 | 1.027E−01 | 1.120E−01 | 8.485E−02 |
| A8 | 1.815E−01 | 5.555E−01 | −1.898E−01 | −8.282E−03 | −3.173E−02 |
| A10 | −4.455E−01 | −3.660E−01 | 2.966E−02 | −6.046E−03 | 5.803E−03 |
| A12 | 6.400E−01 | −1.471E−01 | 1.682E−02 | −2.366E−03 | −6.067E−05 |

TABLE 11-continued

| Example 6 | | | | | |
|---|---|---|---|---|---|
| A14 | 1.016E+00 | 2.387E−01 | 1.046E−02 | 2.666E−04 | −1.248E−04 |
| A16 | 0.000E+00 | −9.877E−01 | −2.218E−02 | 3.464E−04 | 8.594E−06 |

As shown in Table 12 below, the imaging lens in Example 6 satisfies all the conditional expressions (1) to (6).

TABLE 12

| (1) f3/f | 4.11 |
|---|---|
| (2) f4/f | −15.35 |
| (3) f5/f | −7.02 |
| (4) TLA/f | 1.15 |
| (5) r4/r5 | 0.03 |
| (6) r7/r6 | 0.35 |

Figure 12:
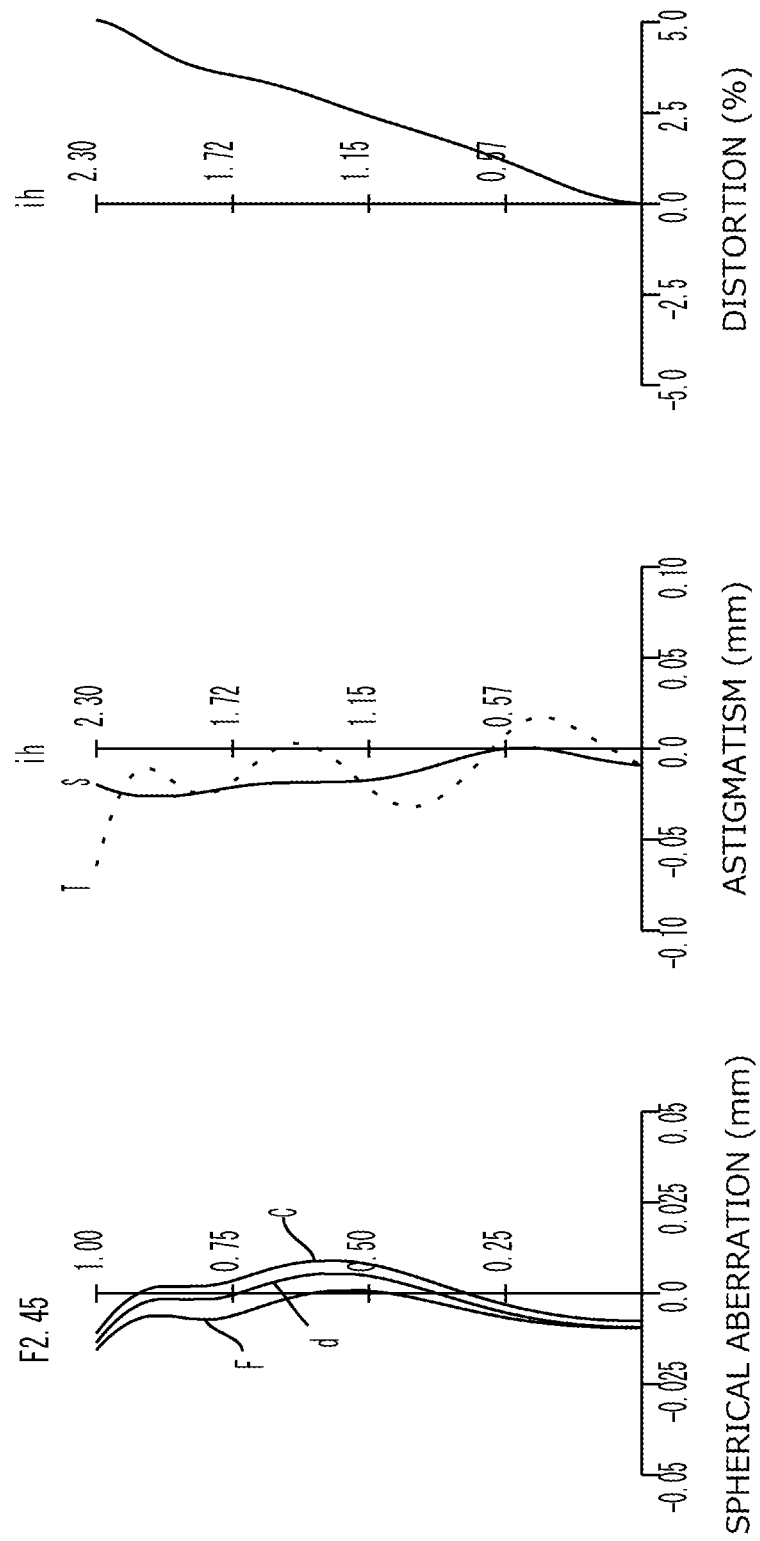
FIG. 12 shows spherical aberration, astigmatism, and distortion of the imaging lens in Example 6.
Figure 13:
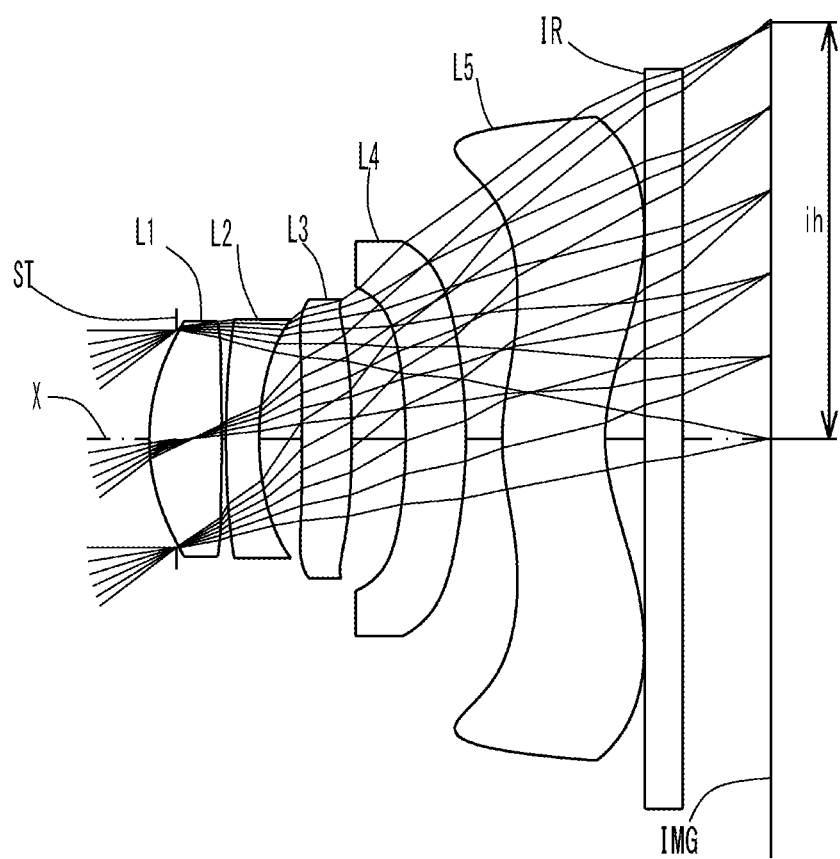
FIG. 13 is a schematic view showing the general configuration of an imaging lens in Example 7.

FIG. 12 shows spherical aberration (mm), astigmatism (mm), and distortion (%) of the imaging lens in Example 6. As shown in FIG. 12, each aberration is corrected properly.

In Example 6, total track length TLA is 3.38 mm, and thus the imaging lens is low-profile though it uses five constituent lenses. Also, the imaging lens offers a wide field of view of about 75 degrees and high brightness with an F-value of 2.5 or less.

EXAMPLE 7

The basic lens data of Example 7 is shown below in Table 13.

TABLE 13

| Example 7 |
|---|
| in mm |
| f = 2.91 |
| Fno = 2.42 |
| ω(°) = 37.8 |
| ih = 2.30 |
| TLA = 3.36 |
| bf = 0.84 |

| Surface Data | | | | |
|---|---|---|---|---|
| Surface No. i | Curvature Radius r | Surface Distance d | Refractive Index Nd | Abbe Number νd |
| (Object Surface) | Infinity | Infinity | | |
| 1 (Stop) | Infinity | −0.150 | | |
| 2* | 1.131 | 0.400 | 1.544 | 55.57 |
| 3* | −7.720 | 0.024 | | |
| 4* | 10.365 | 0.182 | 1.635 | 23.97 |
| 5* | 1.592 | 0.235 | | |
| 6* | 60.869 | 0.275 | 1.544 | 55.57 |
| 7* | −7.456 | 0.300 | | |
| 8* | −2.576 | 0.331 | 1.544 | 55.57 |
| 9* | −3.018 | 0.201 | | |
| 10* | 1.336 | 0.567 | 1.535 | 56.16 |
| 11* | 1.008 | 0.220 | | |
| 12 | Infinity | 0.210 | 1.517 | 64.20 |
| 13 | Infinity | 0.486 | | |
| Image Plane | Infinity | | | |

| Constituent Lens Data | | |
|---|---|---|
| Lens | Start Surface | Focal Length |
| 1 | 2 | 1.843 |
| 2 | 4 | −2.985 |
| 3 | 6 | 12.232 |
| 4 | 8 | −43.989 |
| 5 | 10 | −19.319 |

| Aspheric Surface Data | | | | | |
|---|---|---|---|---|---|
| | 2nd Surface | 3rd Surface | 4th Surface | 5th Surface | 6th Surface |
| k | −1.940E+00 | 0.000E+00 | −3.015E+01 | 0.000E+00 | 0.000E+00 |
| A4 | 1.490E−01 | 3.444E−01 | 3.008E−01 | 1.254E−02 | −2.189E−01 |
| A6 | −1.080E−01 | −8.438E−01 | −3.406E−01 | 5.621E−01 | 2.450E−01 |
| A8 | 5.608E−01 | −1.182E−01 | −9.407E−01 | −1.032E+00 | 1.611E−01 |
| A10 | −1.782E+00 | 1.339E+00 | 1.467E+00 | 9.258E−01 | 8.196E−01 |
| A12 | 8.073E−01 | −1.398E+00 | 1.359E+00 | 6.297E−01 | −1.308E+00 |
| A14 | 0.000E+00 | 0.000E+00 | −9.590E−01 | 5.729E−01 | 1.480E+00 |
| A16 | 0.000E+00 | 0.000E+00 | 0.000E+00 | 0.000E+00 | 0.000E+00 |

TABLE 13-continued

| | Example 7 | | | | |
|---|---|---|---|---|---|
| | 7th Surface | 8th Surface | 9th Surface | 10th Surface | 11th Surface |
| k | 6.362E+01 | −3.199E+00 | 1.959E+00 | −9.981E+00 | −4.785E−00 |
| A4 | −2.013E−01 | 1.979E−01 | 7.999E−03 | −2.422E−01 | −1.629E−01 |
| A6 | 1.032E−01 | −7.684E−01 | 9.977E−02 | 1.110E−01 | 8.434E−02 |
| A8 | 1.849E−01 | 5.594E−01 | −1.902E−01 | −9.081E−03 | −3.193E−02 |
| A10 | −4.426E−01 | −3.687E−01 | 2.998E−02 | −6.330E−03 | 5.759E−03 |
| A12 | 6.357E−01 | −1.494E−01 | 1.715E−02 | −2.438E−03 | −7.460E−05 |
| A14 | 9.809E−01 | 2.430E−01 | 1.084E−02 | 2.556E−04 | −1.286E−04 |
| A16 | 0.000E+00 | −9.787E−01 | −2.096E−02 | 3.498E−04 | 8.320E−06 |

As shown in Table 14 below, the imaging lens in Example 7 satisfies all the conditional expressions (1) to (6).

TABLE 14

| (1) f3/f | 4.20 |
|---|---|
| (2) f4/f | −15.12 |
| (3) f5/f | −6.64 |
| (4) TLA/f | 1.15 |
| (5) r4/r5 | 0.03 |
| (6) r7/r6 | 0.35 |

Figure 14:
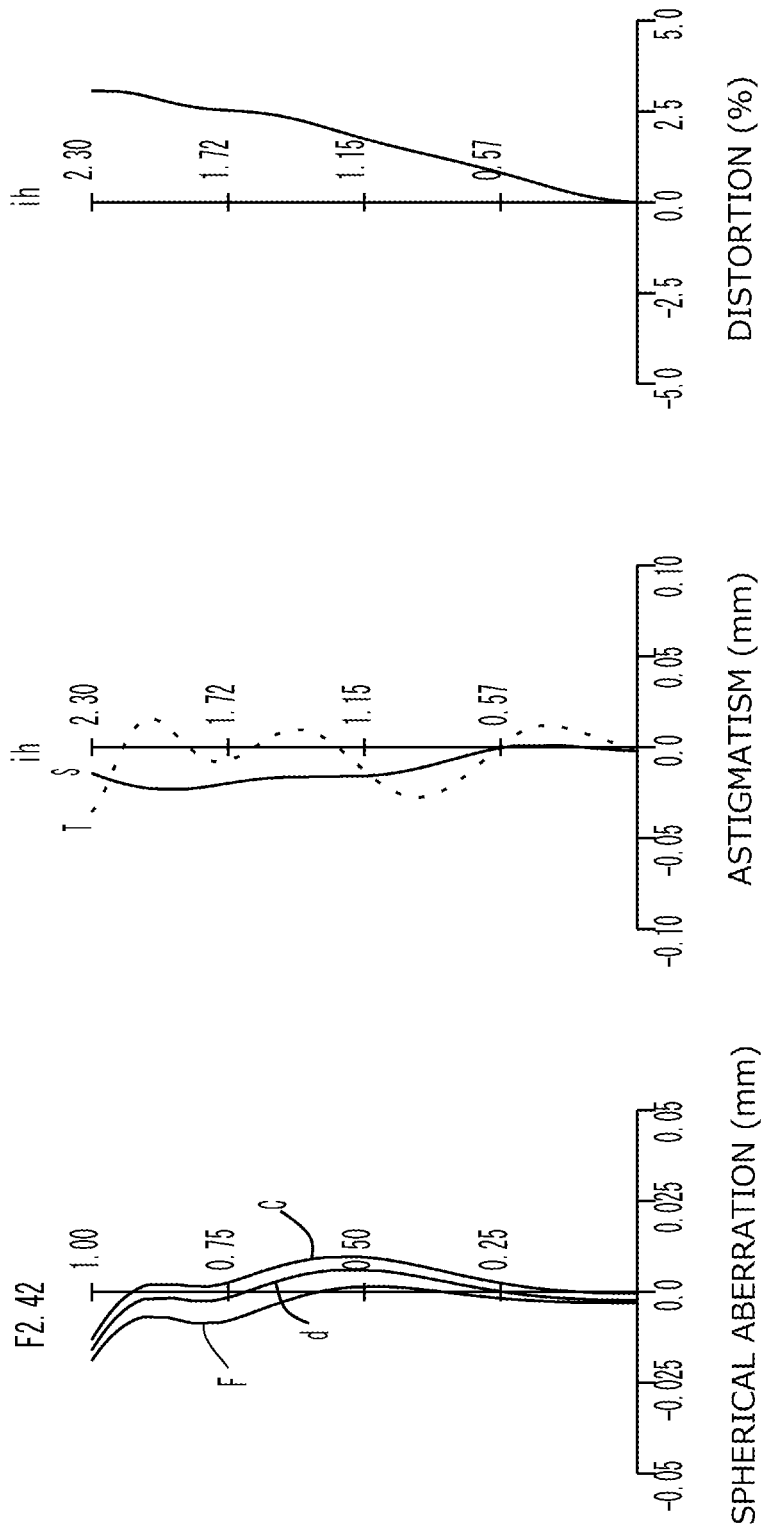
FIG. 14 shows spherical aberration, astigmatism, and distortion of the imaging lens in Example 7.

FIG. 14 shows spherical aberration (mm), astigmatism (mm), and distortion (%) of the imaging lens in Example 7. As shown in FIG. 14, each aberration is corrected properly.

In Example 7, total track length TLA is 3.36 mm, and thus the imaging lens is low-profile though it uses five constituent lenses. Also, the imaging lens offers a wide field of view of about 75 degrees and high brightness with an F-value of 2.5 or less.

As explained above, the imaging lens according to the preferred embodiment of the present invention is low-profile enough to meet the growing demand for low-profile design, with total track length TLA of 3.5 mm or less and a ratio of total track length TLA to maximum image height ih (TLA/2 ih) of about 0.7, though it uses five constituent lenses. In addition, the imaging lens offers a wide field of view of about 75 degrees and high brightness with an F-value of 2.5 or less, corrects aberrations properly, and features low cost.

When the imaging lens composed of five constituent lenses according to the preferred embodiment of the present invention is used for an optical system built in an image pickup device mounted in an increasingly compact and low-profile mobile terminal such as a smart phone, mobile phone or PDA (Personal Digital Assistant), or a game console or an information terminal such as a PC, or a home appliance with a camera function, it contributes to the compactness of the image pickup device and offers high camera performance.

According to the present invention, it is possible to provide a compact low-cost imaging lens which offers high brightness with an F-value of 2.5 or less and a wide field of view and corrects aberrations properly, meeting the demand for low-profile design.

What is claimed is:

1. An imaging lens which forms an image of an object on a solid-state image sensor comprising, in order from an object side to an image side of the imaging lens:
    an aperture stop;
    a first lens having positive refractive power and convex surfaces facing each of the object side and the image side;
    a second lens having negative refractive power;
    a third lens having positive refractive power and convex surfaces facing each of the object side and the image side;
    a fourth lens having negative refractive power; and
    a fifth lens having negative refractive power that is a double-sided aspheric lens,
    wherein conditional expressions (1) and (2) below are satisfied:

$$1.5 < f3/f < 5.0 \qquad (1)$$

$$-42.0 < f4/f < -8.0 \qquad (2)$$

where
   f: focal length of an overall optical system of the imaging lens
   f3: focal length of the third lens
   f4: focal length of the fourth lens.

2. The imaging lens according to claim 1, wherein a conditional expression (3) below is satisfied:

$$-8.5 < f5/f < -2.0 \qquad (3)$$

where
   f5: focal length of the fifth lens.

3. The imaging lens according to claim 1, wherein a conditional expression (4) below is satisfied:

$$0.8 < TLA/f < 1.2 \qquad (4)$$

where
   TLA: distance on an optical axis from an object-side surface of the first lens to an image plane without filters.

4. The imaging lens according to claim 1, wherein conditional expressions (5) and (6) below are satisfied:

$$0 < r4/r5 < 0.3 \qquad (5)$$

$$0 < r7/r6 < 0.5 \qquad (6)$$

where
   r4: curvature radius of an image-side surface of the second lens
   r5: curvature radius of an object-side surface of the third lens
   r6: curvature radius of an image-side surface of the third lens
   r7: curvature radius of an object-side surface of the fourth lens.

5. An imaging lens which forms an image of an object on a solid-state image sensor, comprising, in order from an object side to an image side of the imaging lens:
    an aperture stop;
    a first lens having positive refractive power and convex surfaces facing each of the object side and the image side;

a second lens having negative refractive power, a convex surface facing the object side, and a concave surface facing the image side;
a third lens having positive refractive power and a convex surface facing the object side;
a fourth lens having negative refractive power; and
a fifth lens having negative refractive power that is a double-sided aspheric lens,
wherein conditional expressions (2a) and (5) below are satisfied:

$$-34.46 \leq f4/f < -8.0 \quad (2a)$$

$$0 < r4/r5 < 0.3 \quad (5)$$

where
- f: focal length of an overall optical system of the imaging lens
- f4: focal length of the fourth lens
- r4: curvature radius of an image-side surface of the second lens
- r5: curvature radius of an object-side surface of the third lens.

6. The imaging lens according to claim 5, wherein a conditional expression (1) below is satisfied:

$$1.5 < f3/f < 5.0 \quad (1)$$

where
- f3: focal length of the third lens.

7. The imaging lens according to claim 5, wherein a conditional expression (3) below is satisfied:

$$-8.5 < f5/f < -2.0 \quad (3)$$

where
- f5: focal length of the fifth lens.

8. The imaging lens according to claim 5, wherein a conditional expression (4) below is satisfied:

$$0.8 < TLA/f < 1.2 \quad (4)$$

where
- TLA: distance on an optical axis from an object-side surface of the first lens to an image plane without filters.

9. The imaging lens according to claim 5, wherein a conditional expression (6) below is satisfied:

$$0 < r7/r6 < 0.5 \quad (6)$$

where
- r6: curvature radius of an image-side surface of the third lens
- r7: curvature radius of an object-side surface of the fourth lens.

* * * * *